United States Patent

Haartsen et al.

[11] Patent Number: 5,839,075
[45] Date of Patent: Nov. 17, 1998

[54] METHODS AND SYSTEMS FOR ALLOCATING A CELLULAR COMMUNICATIONS CHANNEL FOR COMMUNICATION BETWEEN A CELLULAR TERMINAL AND A TELEPHONE BASE STATION USING RECEIVED SIGNAL STRENGTH MEASUREMENTS

[75] Inventors: Jacobus Cornelius Haartsen, Staffanstorp, Sweden; Paul W. Dent, Pittsboro, N.C.

[73] Assignee: Ericsson Inc., Triangle Park, N.C.

[21] Appl. No.: 517,710

[22] Filed: Aug. 21, 1995

[51] Int. Cl.$^6$ ............... H04Q 7/20; H04Q 7/24
[52] U.S. Cl. ............ 455/450; 455/422; 455/437; 455/509
[58] Field of Search ............... 379/58, 59, 60, 379/61, 62, 63; 455/33.1, 33.2, 34.1, 34.2, 54.1, 54.2, 56.1, 62, 63, 422, 426, 429, 432, 436, 437, 442, 443, 444, 446, 450, 452, 455, 509, 513, 516, 517, 524

[56] References Cited

U.S. PATENT DOCUMENTS

| | | | |
|---|---|---|---|
| 4,989,230 | 1/1991 | Gillig et al. | 379/59 |
| 5,048,059 | 9/1991 | Dent | 375/94 |
| 5,402,470 | 3/1995 | DeVaney | 455/422 |
| 5,406,615 | 4/1995 | Miller, II et al. | 455/436 |
| 5,428,668 | 6/1995 | Dent et al. | 379/59 |
| 5,499,387 | 3/1996 | Chambert | 455/33.2 |
| 5,521,961 | 5/1996 | Fletcher et al. | 379/59 |
| 5,533,099 | 7/1996 | Byrne | 455/444 |
| 5,546,443 | 8/1996 | Raith | 379/59 |
| 5,551,064 | 8/1996 | Nobbe et al. | 455/62 |
| 5,594,782 | 1/1997 | Zicker et al. | 455/444 |
| 5,659,598 | 8/1997 | Byrne et al. | 455/436 |

OTHER PUBLICATIONS

Norton et al., *I and Q Modulators for Cellular Communications Systems*, Microwave Journal, vol. 34, No. 10, Oct. 1991, pp. 63–79.

Blecher, *Advanced Mobile Phone Service*, IEEE Transactions on Vehicular Technology, vol. VT–29, No. 2, May 1980, pp. 238–244.

Primary Examiner—Dwayne Bost
Assistant Examiner—Nay Maung
Attorney, Agent, or Firm—Myers Bigel Sibley & Sajovec

[57] ABSTRACT

A cellular communications channel is allocated for communication between a cellular terminal and a telephone base station wherein the telephone base station connects a wire telephone network to the cellular terminal within a local region in a cell of a wide area cellular network which uses a plurality of control channels and communications channels within a cellular network spectrum, by controlling the cellular terminal to measure the received signal strengths of the control and communications channels. The cellular terminal is controlled to measure received signal strengths of the control channels. A set of communications channels associated with measured control channel having lowest received signal strength is identified. The cellular terminal is then caused to measure the received signal strengths of the set of communications channels. A communications channel having the lowest received signal strength is selected from the set of communications channels. The selected communications channel having lowest received signal strength is used for communication between the cellular terminal and the telephone base station within the local region. The selected communications channel reduces co-channel interference between the telephone base station and the wide area cellular network and also reduces co-channel interference among the telephone base stations themselves.

34 Claims, 10 Drawing Sheets

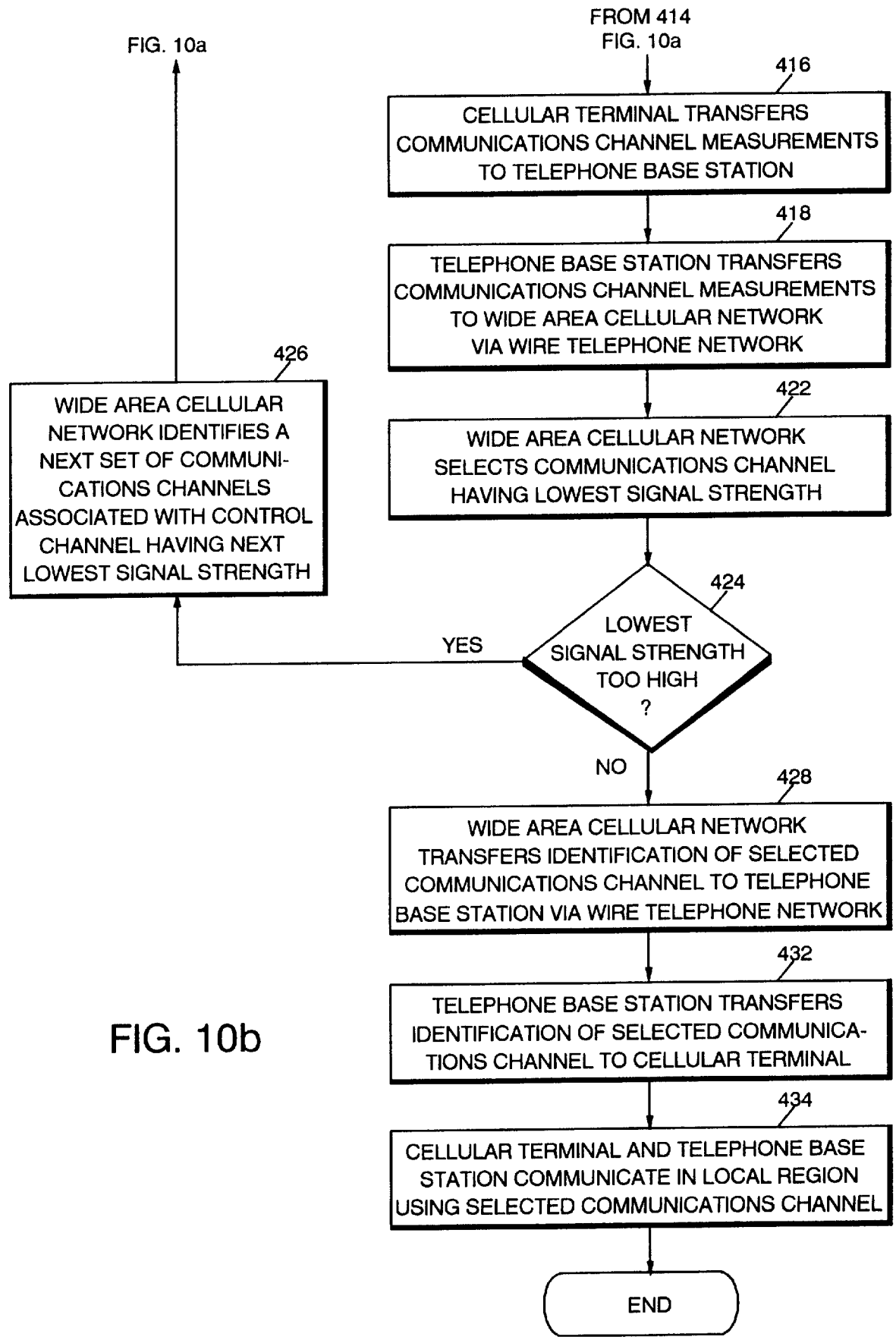

METHODS AND SYSTEMS FOR ALLOCATING A CELLULAR COMMUNICATIONS CHANNEL FOR COMMUNICATION BETWEEN A CELLULAR TERMINAL AND A TELEPHONE BASE STATION USING RECEIVED SIGNAL STRENGTH MEASUREMENTS

FIELD OF THE INVENTION

This invention relates to communications systems and more particularly to radio personal communications systems for use within wide area cellular networks.

BACKGROUND OF THE INVENTION

Radio communications systems are increasingly being used for wireless mobile communications. An example of a radio communications system is a wide area cellular phone network. Cellular radio communications systems are wide area communications networks which utilize a frequency (channel) reuse pattern. The design and operation of an analog cellular phone system is described in an article entitled Advanced Mobile Phone Service by Blecher, IEEE Transactions on Vehicular Technology, Vol. VT29, No. 2, May, 1980, pp. 238–244. The analog mobile cellular system is also referred to as the "AMPS" system.

Recently, digital cellular phone systems have also been proposed and implemented using a TimeDivision Multiple Access (TDMA) architecture. Standards have also been set by the Electronics Industries Association (EIA) and the Telecommunications Industries Association (TIA) for an American Digital Cellular (ADC) architecture which is a dual mode analog and digital system following EIA/TIA document IS-54B. Telephones which implement the IS-54B dual mode architecture are presently being marketed by the assignee of the present invention. Different standards have been promulgated for digital cellular phone systems in Europe. The European digital cellular system, also referred to as GSM, also uses a TDMA architecture.

Proposals have recently been made to expand the cellular phone network into a radio personal communications system. The radio personal communications system provides mobile radio voice, digital, video and/or multimedia communications using radio personal communications terminals. Thus, any form of information may be sent and received. Radio personal communications terminals include a radio telephone, such as a cellular telephone, and may include other components for voice, digital, video and/or multimedia communications.

A radio personal communications system includes at least one telephone base station also referred to herein as a base station. A base station is a low power transceiver which communicates with a radio personal communications terminal such as a cellular terminal over a limited distance, such as tens of meters, and is also electrically connected to the conventional public wire network. The base station allows the owner of a radio personal communications terminal to directly access the wire network without passing through the cellular phone network, whose access rates are typically more costly. When located outside the range of the base station, the personal communications terminal automatically communicates with the cellular phone network at the prevailing access rates.

A major problem in implementing a radio personal communications system using a common frequency allocation for both the base station and the cellular phone network is the frequency overlap between the cellular phone network and the base station. As understood by those having skill in the art, only a limited number of frequencies are available for radio communications. In the United States, cellular phone networks have been allocated 832 30 kHz wide channels. Within this spectrum, each regional provider can substantially allocate and use these frequencies as it sees fit. Additional ranges of frequencies are also being allocated in the United States for use as wide area cellular communications networks.

Cordless phones, such as those used by individuals in their homes, utilize a separate range of frequencies, in the United States from 46 MHz to 49 MHz. Therefore, they are able to operate within a cellular network without interference. However, such phones are unable to operate as cellular phones connected to the cellular network when out of range of their individual base stations. Dual mode phones which operate both as a cellular phone within the cellular frequency range (824–894 MHz) and as a conventional cordless phone (46–49 MHz) are described in U.S. Pat. No. 4,989,230 to Gillig et al.

Frequency overlap between the network and the base stations can be prevented if the network and base stations are allocated different bands of frequencies as with the dual mode cellular and cordless phone discussed above. However, such a hybrid system is not an efficient allocation of the frequency spectrum. Moreover, a hybrid personal communications terminal may be more expensive and complicated because additional circuitry may be required.

A major advance in preventing frequency overlap between the network and the base stations is described in U.S. Pat. No. 5,428,668 to the present inventors, entitled Radio Personal Communications System and Method for Allocating Frequencies for Communication Between a Cellular Terminal and a Base Station, assigned to the assignee of the present invention, the disclosure of which is hereby incorporated herein by reference. In the '668 Patent, a base station connects a wire telephone network to the cellular terminal within a local region of a wide area cellular network. The base station includes a housing, which is preferably portable, and a wire telephone network connector extending within the housing for connecting the base station to the wire telephone network. Activation means within the housing is also electrically connected to the wire telephone network connector for detecting an incoming call on the wire telephone network. A radio transceiver within the housing is responsive to the activation means for communicating with the cellular terminal using a selected frequency within the spectrum of the wide area cellular network when the cellular terminal is within range of the base station. When the cellular terminal is not within the range of the base station, communications take place from the cellular terminal to the wide area cellular network. The communications through the base station occur at a selected frequency (channel) within the spectrum of the wide area cellular network, but at the lower billing rates of the wire telephone network, and can occur without adding to the load on the wide area cellular network.

Same channel interference between the wide area cellular network and the base station is reduced by selecting an available channel within the cellular spectrum for communications between the cellular terminal and the base station when the cellular terminal is within range of the base station. The selected channel utilizes one of the frequencies of the wide area cellular network which is not allocated to the cell of the wide area cellular system in which the base station is located.

As described in the '668 Patent, frequency indicating signal is received by the base station or the cellular terminal from the wide area cellular network operator over the wire telephone network, responsive to a request from the base station or the cellular terminal. This allows the network operator to assign frequencies for base stations which minimize same channel interference with the wide area cellular network. The system carrier also can obtain additional revenue from unused frequencies within a network cell by leasing these frequencies for base station operation within the cell. The frequency assignment request may be initiated automatically upon application or reapplication of power to the base station. Alternatively, manual user intervention may be required.

In another aspect of the '668 Patent, the base station detects if the electrical connection of the wire telephone network to the wire telephone network connector has been lost and prevents the transceiver from transmitting at the previously selected frequency if the connection has been lost. This prevents a base station from being disconnected and reinstalled in a new location where the previously selected frequency could interfere with frequencies in use in that area by the wide area cellular network. Optionally, this detection and disable aspect responds to loss of both the power and telephone connections rather than just loss of the telephone connection or power connection.

Notwithstanding the significant improvement of the allocation system and method of the '668 Patent, additional techniques for allocating a cellular communications channel between a cellular terminal and a telephone base station may be desirable. For example, the '668 Patent may require the operator of the wide area cellular network to have knowledge of the cell within which the telephone base station is located in order to be able to identify a cell which is further away. Moreover, the '668 Patent may not solve the problem of mutual interference between two telephone base stations. The wide area cellular network operator may assign the same channel to two adjacent telephone base stations having overlapping local regions and thereby create co-channel interference between the base stations themselves.

SUMMARY OF THE INVENTION

It is therefore an object of the present invention to provide methods and systems for allocating a cellular communications channel for communication between a cellular terminal and a telephone base station.

It is another object of the invention to provide methods and systems for allocating a cellular communications channel for communication between a cellular terminal and a telephone base station without requiring knowledge of the location of the telephone base station.

It is yet another object of the present invention to provide methods and systems for allocating a cellular communications channel for communication between a cellular terminal and a telephone base station which reduce co-channel interference between adjacent telephone base stations having overlapping local regions.

These and other objects are provided according to the present invention by using the cellular terminal to measure received signal strength of control channels and communications channels (also known as "voice channels" or "traffic channels") within the local region and using the received signal strengths to allocate a cellular communications channel between the cellular terminal and the telephone base station. The selected communications channel reduces co-channel interference between the telephone base station and the wide area cellular network and also reduces co-channel interference among the telephone base stations themselves.

In particular, according to the invention, a cellular communications channel is allocated for communication between a cellular terminal and a telephone base station wherein the telephone base station connects a wire telephone network to the cellular terminal within a local region in a cell of a wide area cellular network which uses a plurality of control channels and communications channels within a cellular network spectrum. The cellular terminal is controlled to measure received signal strengths of the control channels. A set of communications channels associated with a measured control channel having lowest received signal strength is identified. The cellular terminal is then caused to measure the received signal strengths of the set of communications channels. A communications channel having the lowest received signal strength is selected from the set of communications channels. The selected communications channel having lowest received signal strength is used for communication between the cellular terminal and the telephone base station within the local region.

By controlling the cellular terminal to measure received signal strength of the control channels, the communications channels associated with cells which are farthest away from the base station are used, thereby reducing interference between the telephone base station and the wide area cellular network. Moreover, by causing the cellular terminal to measure received signal strengths of the set of communications channels associated with the control channel having lowest received signal strength, interference with other telephone base stations is reduced. Accordingly, interference with the wide area cellular network and with other base stations is reduced without the need for the wide area cellular network operator to know the exact location of the telephone base station.

The communications channel having lowest received signal strength may still not be sufficiently low to prevent interference with adjacent base stations. If this is so, the set of communications channels associated with the measured control channel having the next lowest received signal strength is identified and the cellular terminal measures the received signal strengths of this next set of communications channels. The communication channel having the lowest received signal strength from the next set of communications channels is then selected and used for communications. These operations may be repeated until a communications channel having acceptably low signal strength is identified.

The cellular terminal may itself compare the received signal strengths in order to identify the measured control channel having lowest received signal strength and the measured communications channel having lowest received signal strength. Alternatively, the received signal strengths may be relayed to the telephone base station, which compares the received signal strengths and identifies the lowest measured received signal strength from the list provided by the cellular terminal. However, most preferably, the wide area cellular network obtains the received signal strength measurements from the cellular terminal via the base station and wire telephone network, and determines the channel having the lowest received signal strength. Accordingly, in identifying a set of communications channels associated with a measured control channel having lowest received signal strength, the control channel received signal strength measurements are preferably transferred from the cellular terminal to the telephone base station and from the telephone base station to the wide area cellular network via the wire telephone network. The wide area cellular network identifies a measured control channel having lowest received signal strength and the wide area cellular network identifies the set of communications channels associated with the measured control channel having a lowest received signal strength. Similarly, in causing the cellular terminal to measure received signal strengths of the set of communications channels, the identified set of communications channels is preferably transferred to the base station from the wide area cellular network via the wire telephone network and then from the base station to the cellular terminal.

Similarly, in selecting a communications channel having lowest received signal strength from the set of communications channels, the received signal strength measurements are preferably transferred from the cellular terminal to the telephone base station and from the telephone base station to the wide area cellular network via the wire telephone network. The wide area cellular network identifies a measured communication channel having lowest received signal strength and the wide area cellular network selects the communication channel having lowest received signal strength. The identification of the selected communications channel is then transferred to the base station via the wire telephone network and from the base station to the cellular terminal.

Preferably, the received signal strength is measured by the cellular terminal and measurements and other signals are passed between the cellular terminal and the wire telephone network via the base station, while the cellular terminal is parked in the telephone base station. The signals and measurements may be transferred via electrical signals, electromagnetic signals such as optical signals, or acoustic signals such as ultrasound signals. Accordingly, the cellular terminal is controlled to measure received signal strength of control channels and communications channels in the local region so that the wide area cellular network can allocate a channel for communication between the cellular terminal and telephone base station while reducing co-channel interference with the wide area cellular network and with other telephone base stations.

BRIEF DESCRIPTION OF THE DRAWINGS

FIGS. 10A and 10B are a flowchart illustrating operations of a radio personal communications system according to the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

This Detailed Description will begin with a description of radio personal communications systems and methods for channel allocation according to U.S. Pat. No. 5,428,668. Then, methods and systems for channel allocation using received signal strength measurements according to the present invention will be described.

Radio Personal Communications System

Figure 1A:
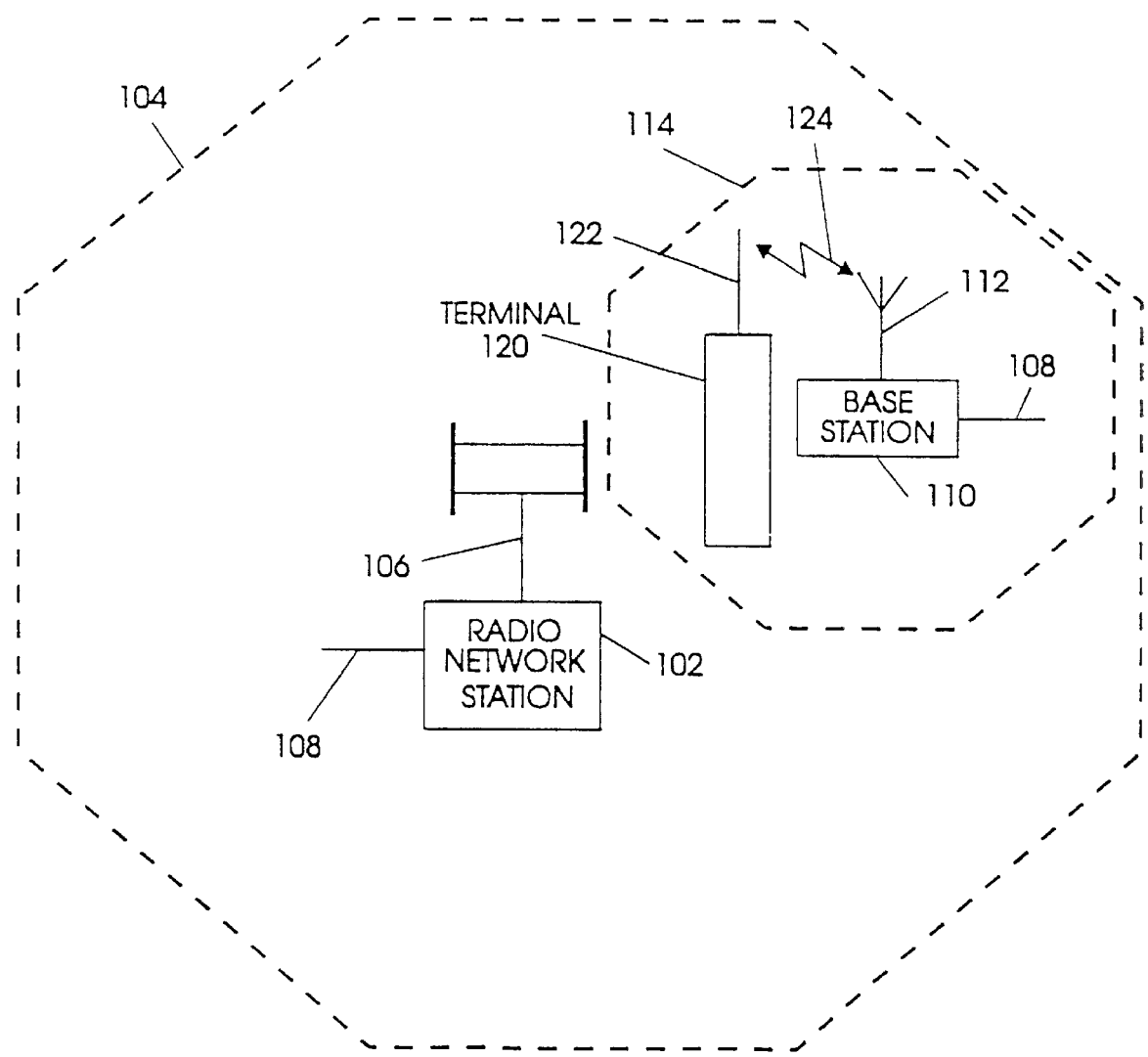
FIGS. 1A and 1B schematically illustrate a radio personal communications system including a base station and a cellular terminal, with radio communications between the terminal and the base station, and radio communications between the terminal and a wide area cellular network, respectively.
Figure 1B:
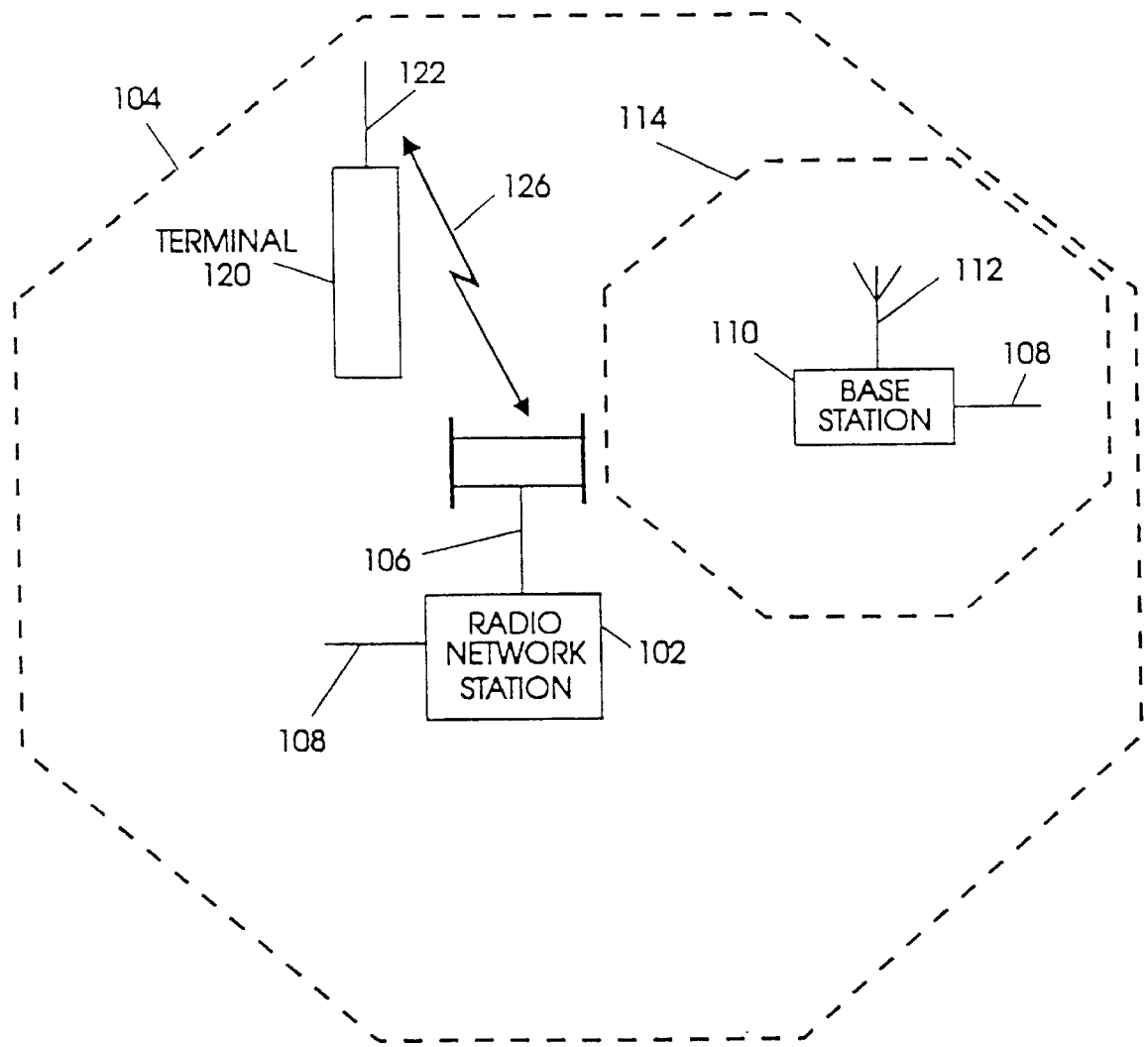
Figure 7:
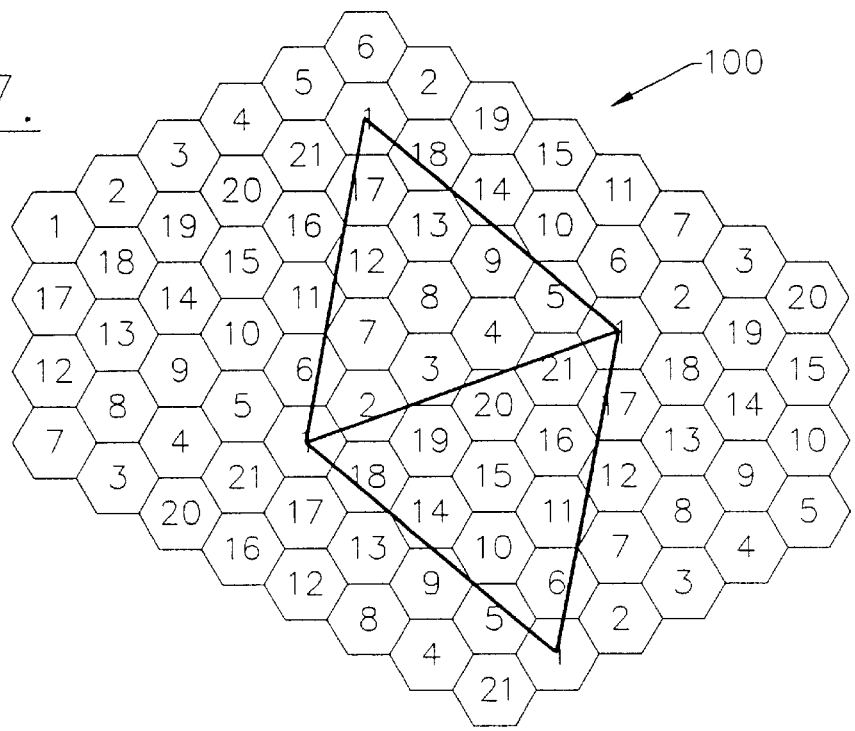
FIG. 7 is a schematic illustration of a first cell re-use pattern for a wide area cellular network.
Figure 8:
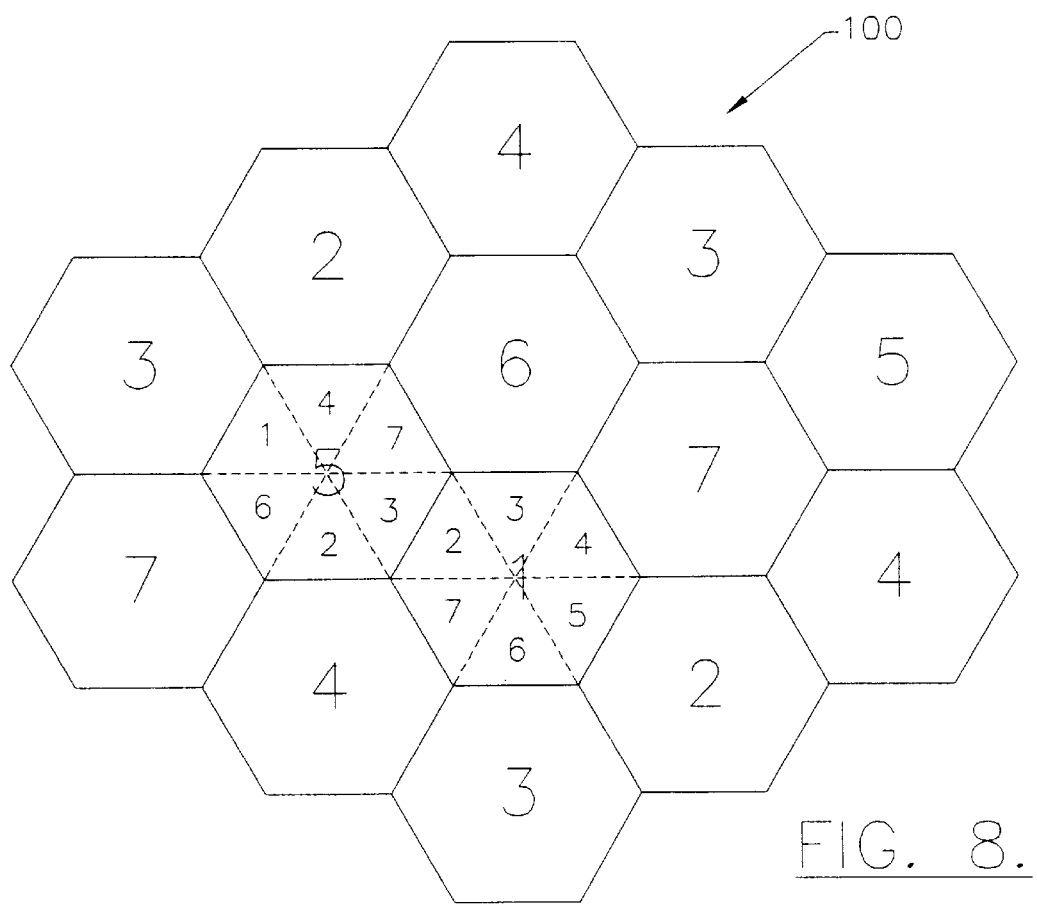
FIG. 8 is a schematic illustration of a second cell re-use pattern for a wide area cellular network.

Referring to FIGS. 1A and 1B, conceptual diagrams of a radio personal communications system are shown. Such a system operates within a wide area cellular network which allocates portions of a plurality of frequencies (channels) within a cellular network spectrum to separate geographic cells. Thus, the system provides a wide area wireless communications network having the capacity to provide high quality wireless communications to a large number of users with a limited number of frequencies allocated to the wide area cellular network. As shown in FIG. 1A, a wide area cellular network includes at least one radio network cell station 102, such as a cellular telephone cell station, for transmitting and receiving messages in a network cell indicated by 104, via cell antenna 106. The cell 104 of radio network cell station 102 is typically represented graphically as illustrated in FIGS. 1A, 1B, 7 and 8. Radio network cell station 102 also interfaces with the wire telephone network 108. It will be understood by those having skill in the art that a wide area cellular network 100 typically includes many radio network cell stations 102 to cover a large area as illustrated in FIGS. 7 and 8. In such a system each radio network cell station 102 covers a cell 104 within wide area cellular network 100 and may interface with a central station (not shown) by wireless (radio) communications. The central station may provide the connection to wire telephone network 108 for all of the network cell stations 102 that make up wide area cellular network 100.

Still referring to FIG. 1A, a telephone base station 110 is located within the cell 104 of a network cell station 102 of wide area cellular network. Base station 110 includes a low power transceiver for transmitting and receiving via base station antenna 112, over a limited local region 114, typically on the order of tens of meters. Thus, a base station may be used for transmission and receipt of radio personal communications in a home or office. Base station 110 also is electrically connected to the wire telephone network 108. Wire telephone network 108, is also referred to as the Public Switched Telephone Network (PSTN). PSTN 108 is the regular "wire line" telephone system supplied by, for example, the regional Bell Operating Companies, and may use copper wire, optical fiber or other stationary transmission channels. Base station 110 may be wired directly to PSTN 108 or connect through a PABX (not shown).

Still referring to FIG. 1A, a radio personal communications terminal 120 is shown for radio communications with both base station 110 and radio network cell station 102 via antenna 122. Radio personal communications (cellular) terminal includes a radio telephone such as a cellular phone. Cellular terminal 120 may also include, for example, a full computer keyboard and display, a scanner, and full graphics and multimedia capabilities.

As illustrated in FIG. 1A, when terminal 120 is in the local region 114 of the base station 110, a radio link 124 therebetween is established. As shown in FIG. 1B, when the terminal 120 is outside the local region 114 of the base station 110, but within the cell 104 of the network cell station 102, a new radio link 126 is automatically established with the network cell station 102 to establish communications through wide area cellular network 100. Thus, when the user is relatively close to the base station 110 (i.e. within the home or office), wireless communications take place with the base station so that wide area cellular network, with its higher billing rate structure, is bypassed. When the user is relatively far from the base station 110, communications take place with the cellular network.

It will be understood by those having skill in the art that a complete radio personal communications system will typically include many base stations 110, terminals 120 and radio network cell stations 102. It will also be understood by those having skill in the art that conventional communications and handoff protocols may be used with the radio personal communications system, and need not be described further herein. For purposes of this description, it will be assumed that the spectrum allocation for the radio network cells is the IS-54B cellular phone spectrum allocation which is illustrated in Table 1 below.

TABLE 1

| System | Bandwidth (MHz) | Number of Channels | Boundary Channel Number | Transmitter Center Frequency (MHz) MOBILE | BASE |
|---|---|---|---|---|---|
| Not Used | | 1 | | (824.010) | (869.010) |
| A* | 1 | 33 | 991 | 824.040 | 869.040 |
| | | | 1023 | 825.000 | 870.000 |
| A | 10 | 333 | 1 | 825.030 | 870.030 |
| | | | 333 | 834.990 | 879.990 |
| B | 10 | 333 | 334 | 835.020 | 880.020 |
| | | | 666 | 844.980 | 889.980 |
| A' | 1.5 | 50 | 667 | 845.010 | 890.010 |
| | | | 716 | 846.480 | 891.480 |
| B' | 1.5 | 83 | 717 | 846.510 | 891.510 |
| | | | 799 | 848.970 | 893.970 |

| Transmitter | Channel Number | Center Frequency (MHz) |
|---|---|---|
| MOBILE | 1 ≦ N ≦ 799 | 0.030 N + 825.000 |
| | 990 ≦ N ≦ 1023 | 0.030 (N−1023) + 825.000 |
| BASE | 1 ≦ N ≦ 799 | 0.030 N + 870.000 |
| | 990 ≦ N ≦ 1023 | 0.030 (N−1023) + 870.000 |

In the radio personal communications system described in FIGS. 1A and 1B, it is important to avoid same channel interference between base station 110 and the radio network cell station 102. Same channel interference can be avoided by using two discrete spectra for the network calls and for the base station. For example, the base station can use cordless telephone protocols. Unfortunately, this requires the terminal 120 to operate under both cellular and cordless protocols, which may be costly and wasteful.

According to U.S. Pat. No. 5,428,668, the operator of network 100, which has typically been assigned the use of a specific plurality of frequencies within a frequency spectrum of a designated geographic region by a regulatory authority, is allowed to assign frequencies and optionally power levels, of base station 110. The wide area cellular network operator (provider) can assign frequencies and optionally power levels to base station 110 to minimize same channel interference and to maximize revenue from the assigned frequency spectrum.

Base station 110 uses the obtained frequency and power level, respectively, to govern operation of base station 110. Frequency and power level signals may also be used to control operation of the radio personal communications (cellular) terminal 120 as will be described below. As will also be described below cellular terminal 120 may be controlled to operate at the same frequency and power level as base station 110. Alternatively, a different frequency and power level may be provided. Thus, the wide area cellular network operator can receive revenue from the use of the frequency, and simultaneously prevent radio communications between base station 110 and terminal 120 from interfering with communications within cellular network 100.

Figure 2:
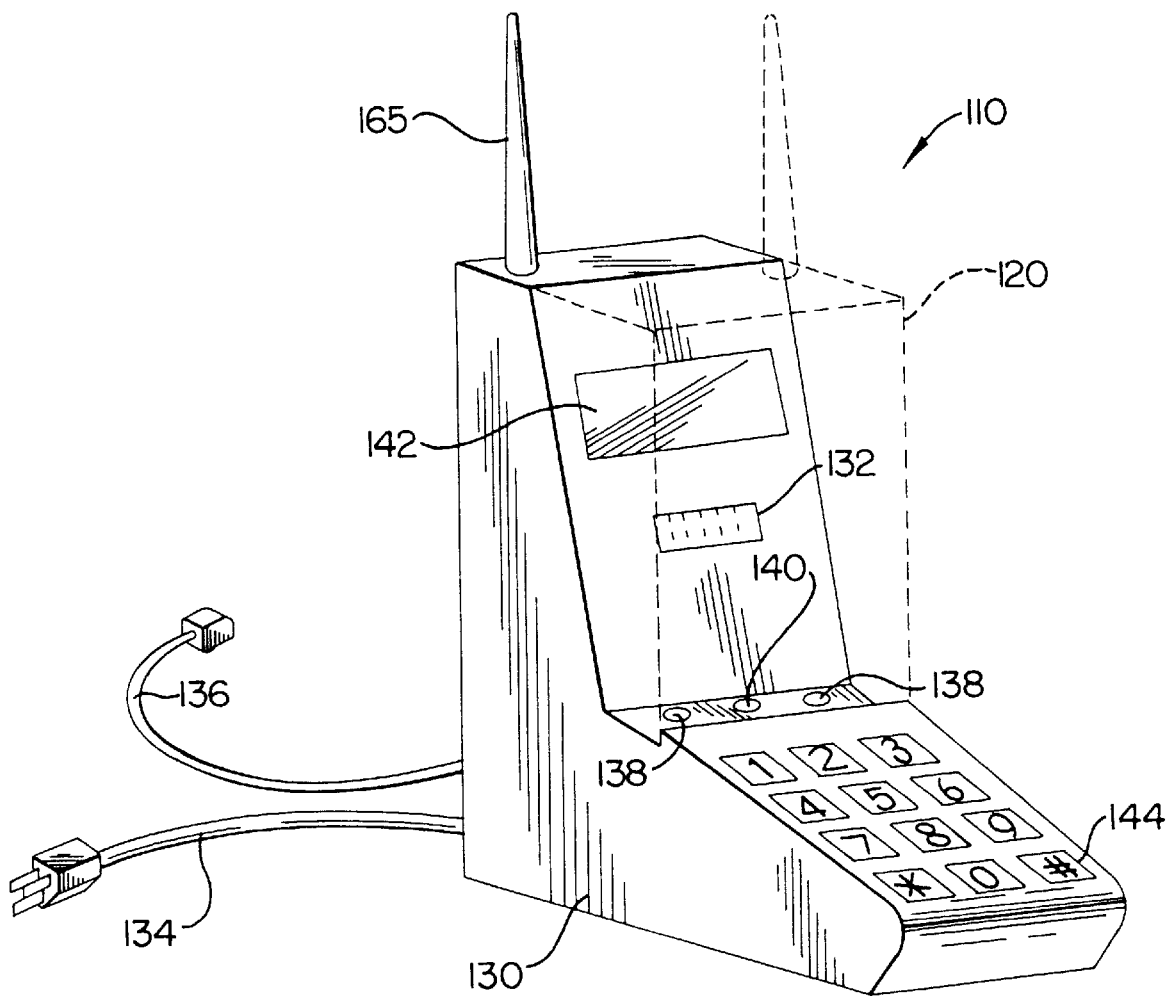
FIG. 2 illustrates a front perspective view of an embodiment of a base station, with a terminal shown in hidden lines.

An embodiment of a base station and cellular terminal is illustrated in FIG. 2. Base station 110 includes housing 130 which is adapted to cooperatively mate with cellular terminal 120 and provide an electrical interface between base station 110 and cellular terminal 120 using electrical connector 132 or other electrical connecter means. Alternatively, electromagnetic communications such as optical communications, or acoustic communications such as ultrasonic communications, may be provided via an appropriate connector and interface. Base station 110 is connected to a power source (power outlet) by power line connection 134 or other power connection means and to a wire telephone network by a wire telphone network connector 136 extending from base station 110 to within housing 130 or other means for electrically connecting base station 110 to a wire telephone network. As shown in FIG. 2, housing 130 is preferably portable to allow the user to move it and reinstall it in different locations. Base station 110 as illustrated in FIG. 2 may further include battery charger connector 138 or other charger interface means which connects battery powered cellular terminal 120 to a battery charger (not shown in FIG. 2) when cellular terminal 120 is inserted or parked in housing 130 as illustrated by hidden lines in FIG. 2. Sensor 140 detects when cellular terminal 120 is parked in housing 130 and the battery charger is activated to charge the battery of battery powered cellular terminal 120. It will be understood by those having skill in the art that a separate sensor 140 need not be used to detect when terminal 120 is parked in housing 130.

Base station 110 as illustrated in FIG. 2 also includes display 142 or other user inidcating means. Alternatively, cellular terminal 120 may include an indicating means which may be used to display signals from base station 110 transmitted over electrical connection 132 when cellular terminal 120 is parked in housing 130. Base station 110 may also include keyboard 144 or other user input means. Alternatively, as with display 142, celllular terminal 120 may inlucde an input means which may be used to provide inputs to base station 110 when cellular terminal 120 is parked in housing 130.

Figure 3:
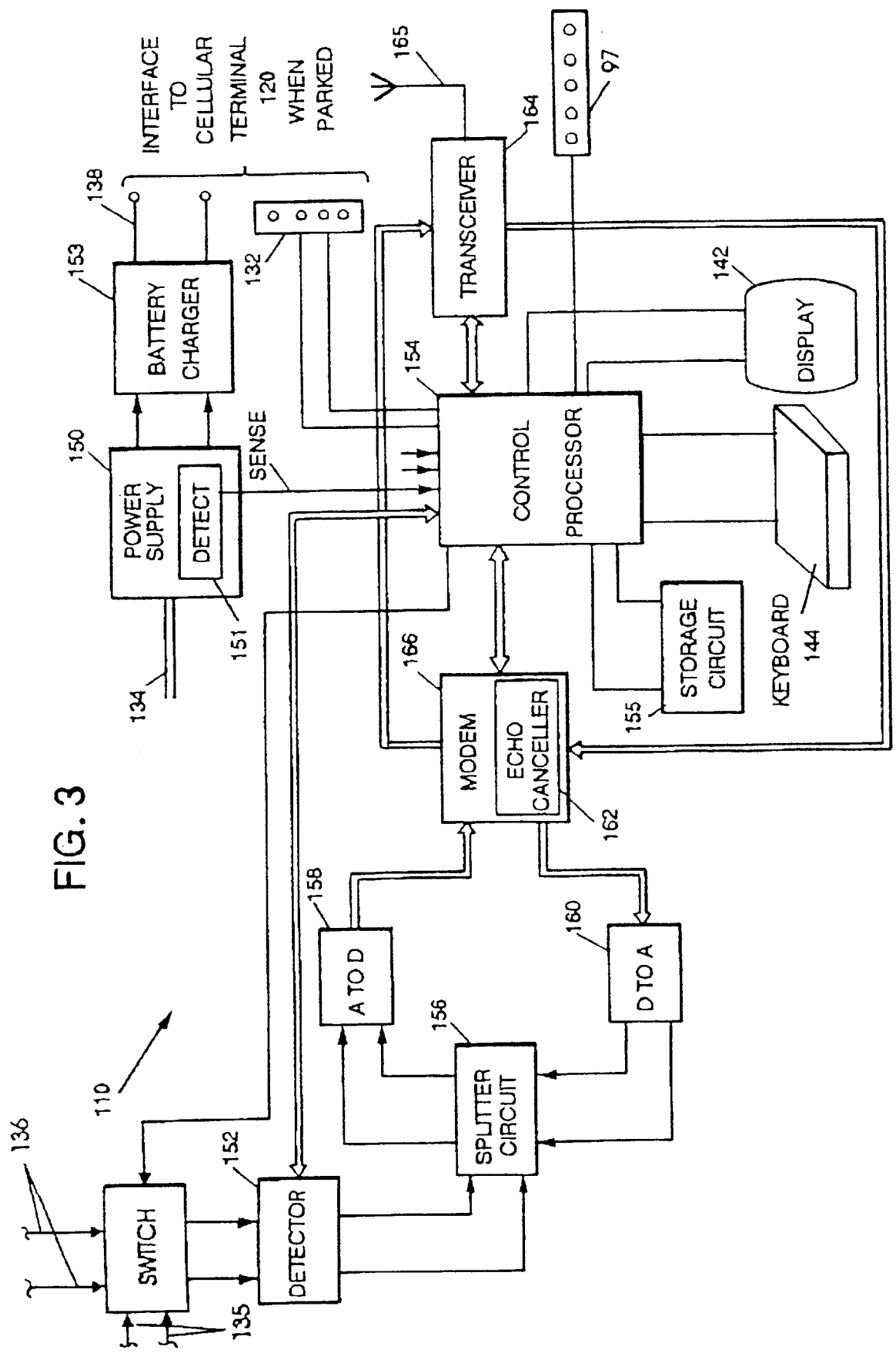
FIG. 3 is a schematic block diagram of the base station of FIG. 2.

A block diagram of an embodiment of a base station 110 is illustrated in FIG. 3. Power supply 150 is connected to power line connector 134 and provides the power supply voltages to the circuitry of base station 110. Power supply 150 further includes power detection means 151 for detecting when the connection of power line connector 134 to the power source has been lost and for providing a sense signal to control processor 154 indicating that power has been lost.

Ringing current and exchange battery voltage detector 152 is electrically connected to wire telephone connector 136 and includes means for detecting an incoming call on wire telephone connector 136 which is connected to wire telephone network 108. Detector 152 further detects if the electrical connection of wire telephone network 108 to connector 136 has been lost. Detector 152 supplies signals to control processor 154 when an incoming call "ring" is detected and when the connection to wire telephone network 108 is lost. An indication that the wire telephone network (line) connection has been lost may then be sent to display 142 under the control of control processor 154.

Control processor 154, in cooperation with ringing current and exchange battery voltage detector 152 provide activation means for initiating communications between wire telephone network 108 and cellular terminal 120 through base station 110 when cellular terminal 120 is within region 114. For incoming calls from wire telephone network (line) 108, detector 152 detects the incoming call and sends an activation signal to control processor 154 which in turn controls subsequent communications operations of base station 110. For calls initiated from cellular terminal 120, control processor 154 detects the communication from cellular terminal 120 received by transceiver circuit 164 or other radio transceiving means connected to antenna 112 at a selected frequency within the spectrum of wide area cellular network 100. Control processor 154 sends a control signal to detector circuit 152 to generate OFF-HOOK and other signals such as pulse dialling that may be necessary to interface with a loop-disconnect line interface such as is typically used by wire telephone network 108.

Splitter circuit 156 effects a split of the two-wire, bidirectional telephone audio signal into a four-wire system of separate send and receive signals. Received signals from the wire telephone network 108 are converted from analog to digital by analog to digital converter (A to D) 158 while transmit signals to wire telephone network 108 are converted from digital to analog by digital to analog converter (D to A) 160. This allows all of the subsequent audio signal processing to be carried out digitally using digital signal processors. Echo canceler 162 attenuates echoes of the signal sent through connector 136 to PSTN wire network 108 to inhibit corrupting of the signal received from the PSTN. Echo canceler circuit 162 further prevents echoes being transmitted to cellular terminal 120 by transceiver circuit 164 or other radio transceiving means connected to antenna 112.

On incoming calls over wire telephone network (line) connector 136, transceiver circuit 164 responds to the ring detect from detector 152 under the control of processor 154 to communicate with cellular terminal 120 using a selected frequency within the frequency spectrum of the wide area cellular network 100. Storage circuit 155 or other storage means is electrically connected to control processor 154 to provide a storage capacity for program and data information such as a frequency indicating signal representing the selected frequency. Storage circuit 155 may include conventional readable and writable memory such as RAM or EEPROM.

After echo cancellation, modem 166 processes received digitized audio signals to extract any digital control messages that might be received along with the audio signal from the wire telephone network (line). Such digital control messages may, for example be programming information for base station 110 transmitted by the operator of wide area cellular network 100. Extracted digital control messages are passed to control processor 154. Modem 166 may perform data/speech discrimination. A digital signal processor such as Texas Instruments type TMS320C56 may be used for echo canceler 162 and modem 166.

Received digitized speech is passed to transceiver 164 for transmission. The digitized speech may first be compressed by compression circuit, not shown, to a lower bit rate using a conventional speech decoding algorithm such as CELP or VSELP. In an analog transmission embodiment of base station 110 of the present invention a conversion circuit, not shown, reconverts the discriminated speech to an analog signal for modulating transceiver 164 which in this embodiment is an analog transceiver.

Radio signals from cellular terminal 120 to base station 110 received by antenna 112 are detected and converted to digital speech signals by transceiver 164. The digital speech signals are then passed to echo canceler circuit 162 and modem circuit 166 for transmission on wire telephone network (line) connector 136 to wire network 108. Alternatively, the received signals may be digitized to complex number form, using for example the LOGPOLAR technique described in U.S. Pat. No. 5,048,049. The complex number stream is then passed to modem 166 for numerical demodulation and conversion to analog speech for sending on the wire telephone line.

The radio personal communications system may also be used for data transmission from cellular terminal 120 when cellular terminal 120 either incorporates a personal computer system or by plugging cellular terminal 120 into a personal computer to connect the computer to modem circuit 166 without the use of a direct wire telephone line cable connection to the computer. When handling data transmissions, modem circuit 166 and transceiver 164 translate the data stream between the over-the-air protocols used and normal wire telephone line data transmission protocols. Transceiver 164 may also detect when the received signal has reverted to voice and, responsive to control processor 154, effect a reversion of modem circuit 166 and echo canceler circuit 162 to the processing of voice signals.

Transceiver 164 may be selected to generate and receive signals conforming to any standard, for example, AMPS, ETACS, NMT450, NMT900, GSM, DCS1800 or IS54. In addition, transceiver 164 may generate or receive signals conforming to air-interface standard for communications with satellite systems, such as INMARSAT-M, INMARSAT-P, IRIDIUM, ODYSSEY, GLOBALSTAR, ELLIPSAT or M-SAT. All such standards may be utilized with the present invention to provide communications from cellular terminal 120 through normal PSTN wire lines 108 and avoiding using the wide area system.

Figure 4:
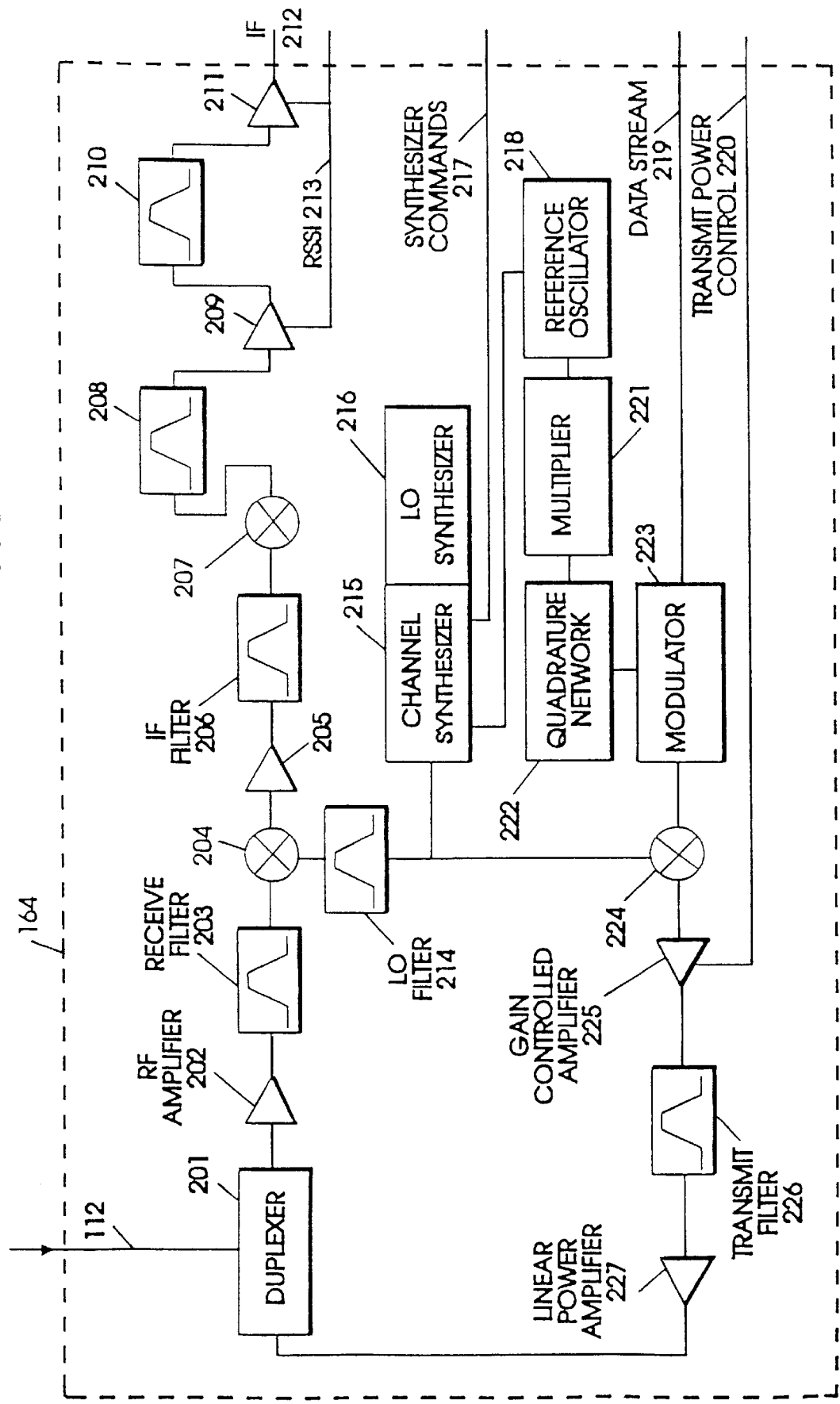
FIG. 4 is a schematic block diagram of the base station transceiver of FIG. 3.

FIG. 4 illustrates a schematic block diagram of a radio transceiver 164 of FIG. 3. As shown, transceiver 164 includes circuitry for both the reception and transmission of the radio frequency signals. Signals received by the antenna 112 are directed to the receive circuits by the duplexer 201. The duplexer is a filter with two separate bandpass responses: one for passing signals in the receive band and another for passing signals in the transmit band. Duplexer 201 allows simultaneous transmission and reception of signals by using different receive and transmit frequencies. For example, in the AMPS or IS54B architectures, the receive and transmit frequencies are separated by 45 MHz.

After passing through the duplexer 201, received signals are amplified by a low noise radio frequency (RF) amplifier 202. This amplifier provides just enough gain to overcome the expected losses in the front end circuitry. After amplification, unwanted components of the signal are filtered out by the receive filter 203. After filtering, the signal is mixed down to a first intermediate frequency (IF) by mixing it in mixer 204 with a second signal generated by the channel synthesizer 215 and filtered by Local Oscillator (LO) filter 214. The first IF signal is then amplified by amplifier 205 and unwanted mixing products are removed by IF filter 206. After filtering, the first IF is mixed in mixer 207 to yet another lower frequency or second IF signal, using a signal provided by local oscillator synthesizer 216. The second IF signal is then filtered by two filters 208 and 210, and amplified by multistage amplifiers 209 and 211 to obtain an IF signal 212 and a radio signal strength indication (RSSI) signal 213. Thereafter, it undergoes a process of detection, for example, as described in U.S. Pat. No. 5,048,059 to Dent, the disclosure of which is incorporated herein by reference.

In order to transmit, a datastream 219 is generated by modem 166 (FIG. 3). In ADC architecture, the datastream is organized as bursts for time division multiplexing with other users. Reference oscillator 218 generates a precise frequency which is used as a stable reference for the RF circuits. The output of oscillator 218 is passed through a multiplier 221 where it experiences a sixfold increase in frequency. This frequency is then passed into a quadrature network 222 which produces two signals of equal amplitude which have a quadrature phase relationship, i.e. they are offset by 90°. These quadrature signals, along with the datastream 219, are combined in the modulator 223 to create a modulated signal, as described in an article entitled I and Q Modulators for Cellular Communications Systems, D. E. Norton et al., Microwave Journal, Vol. 34, No. 10, October 1991, pp. 63–79. The modulated signal is passed to a mixer 224 which translates the signal to radio frequency. The exact radio frequency is determined by the local oscillator signal provided by the channel synthesizer 215. The radio frequency signal is passed through a variable gain controlled amplifier 225. The gain of this amplifier, which is controlled by means of a voltage on transmit power control line 220, determines the eventual output power, since the linear power amplifier 227 has fixed gain. Filtering is performed by transmit filter 226.

Figure 5:
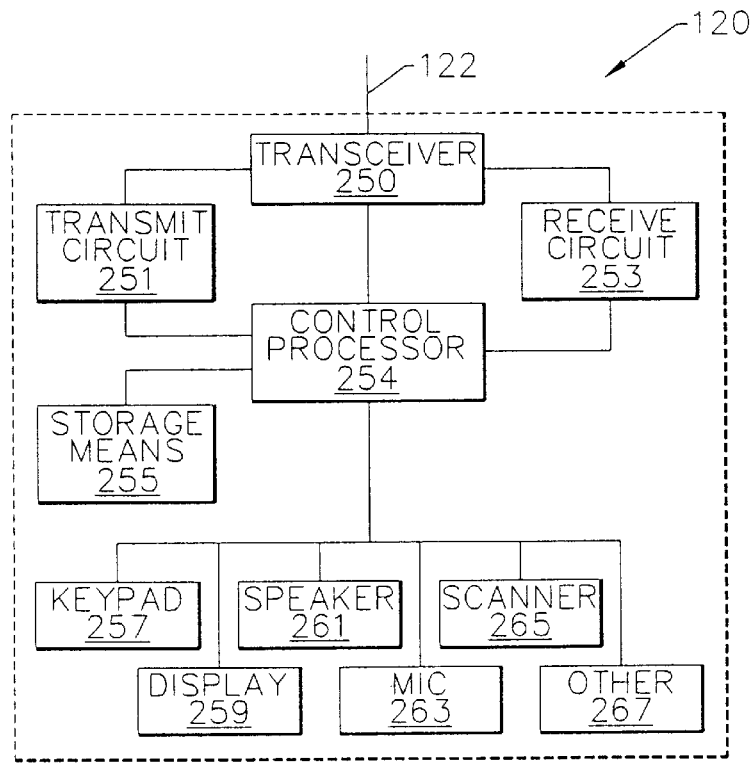
FIG. 5 is a schematic block diagram of a cellular terminal.

Referring now to FIG. 5, the design of cellular terminal 120 is similar to that of base station 110 (FIG. 3) except that a ringing current and exchange battery voltage detector 152 are not present. As illustrated in FIG. 5, cellular terminal 120 includes transceiver 250 or other means for communicating with wide area cellular network 100 when cellular terminal 120 is not within the local region 114 of base station 110 and for communicating with transceiver 164 of base station 110 when cellular terminal 120 is within local region 114. Transceiver 250 is connected to antenna 122. Cellular terminal 120 further includes its own control processor 254 and storage means 255 similar to those described with respect to base station 110 and transmit circuit 251 and receive circuit 253 for receive and transmit signal processing respectively.

As further shown in FIG. 5, when terminal 120 is a cellular phone, it includes a keypad 257, a display 259, a speaker 261, and a microphone 263. In order to provide a computer communications terminal for receipt and transmission of audio, video and data and/or multimedia signals, keypad 257 may be a full scale personal computer keyboard and display 259 may be a large graphics display. A scanner 265 may also be provided as may other devices 267 such as disk drives and modems. The design of terminal 120 is well known to those having skill in the art and need not be described further herein.

As described above, radio communications between base station 110 and cellular terminal 120 occurs at a frequency assigned by the wide area cellular network provider to avoid same channel interference between base station 110 and network cell station 102. As described above, the channel selection means which obtains the channel within the cellular spectrum of wide area cellular network 100 for communications between cellular terminal 120 and base station 110 is included in base station 110. For non-multiplexed systems, any given frequency is one channel; however, for multiplexed type systems each frequency may carry multiple communications channels. The present description refers to frequency, however, it is to be understood that in a multiplexed system base station 110 may be assigned a specific channel or slot using such selected frequency.

Figure 6:
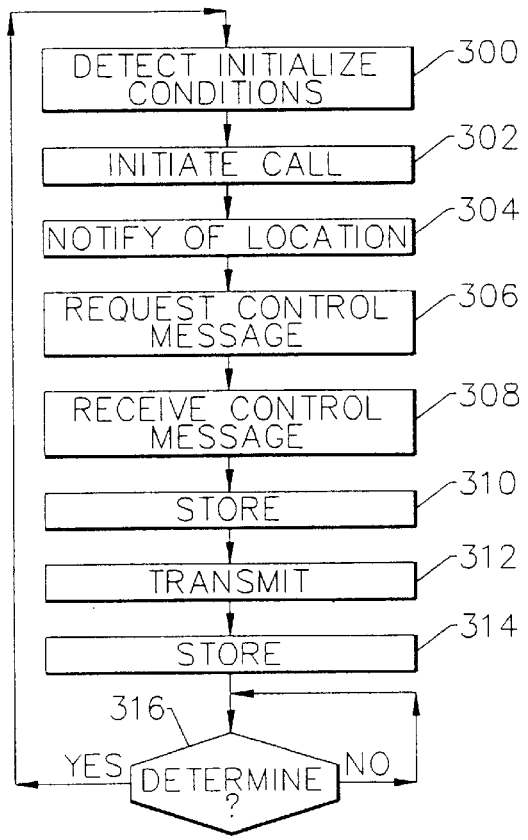
FIG. 6 is a flowchart illustrating operations during initialization of a radio personal communications system according to U.S. Pat. No. 5,428,668.

The selected frequency may be entered into base station 110 from external to base station 110 as an extracted digital control message, as described above, in which case the frequency indicating signal is received by base station 110 by wire line communications over connector 136. The frequency indicating signal is converted to a synthesizer command and applied to line 217 to produce the requisite transmit and receive frequency. The power level indicating signal is converted to a transmit power control signal and applied to line 220 to control the transmit power. The conversions are preferably performed by control processor 154 using conventional techniques. Operations performed to set the frequency, and optionally power level, will be described below in connection with FIG. 6.

The frequency indicating signal from the operator of wide area network 100 is selected to minimize interference between base station 110 and network cell station 102. Preferably, a frequency is utilized which is one of the frequencies within the cellular spectrum which is not allocated to the network cell station 102 in the cell 104 in which base station 110 is located. More preferably, a frequency is selected from the group of frequencies within the cellular spectrum which is allocated to a cell of wide area cellular network 100 which is farthest from said base station as illustrated in FIGS. 7 and 8.

The circuitry of base station 110 as illustrated in FIG. 3 further functions as a requesting means within housing 130, electrically connected to wire telephone line connector 136, for communicating with the operator of wide area network 100 over wire network 108 using a predetermined service number stored in storage circuit 155. Control processor 154 initiates a call using the predetermined service number by sending control and a data signals representing a request. Modem 166 and converter 160 are used to transmit the request over line 136 as a known type of carrier which may be detected by a modem (not shown) set up for this purpose by the operator of wide area cellular network 100. The operator of wide area cellular network assigns a frequency manually or automatically, to reduce or avoid frequency interference. The requested frequency indicating signal from the operator of wide area cellular network 100 is then received by modem 166 and an extracted digital control message is provided to control processor 154 as described above. An indication of the selected frequency is stored in storage circuit 155, based upon the received frequency indicating signal. Alternatively, frequencies can be assigned via a removable frequency indicator, such as a "smart card" as described in copending application Ser. No. 08/093,076 to Rydbeck entitled Method and Apparatus for Controlling Transceiver Operations in a Radio Communication System, assigned to the assignee of the present application, the disclosure of which is hereby incorporated herein by reference.

A frequency indicating signal is also provided to cellular terminal 120 when terminal 120 is parked in base station 110 and stored in storage means 255 as an indication of the selected frequency so that both cellular terminal 120 and base station 110 have the selected frequency information. Alternatively, the frequency information may be provided to cellular terminal 120 using the wide area cellular network 100 if cellular terminal 120 is not parked in base station 110 and the user does not wish to park the terminal before initiating communications between base station 110 and cellular terminal 120 following a change in the selected frequency.

The process of requesting a frequency indicating signal may be initiated by the operator as an input using keyboard 144, for example, by pressing #0 to initiate calling the predetermined service number. Alternatively, the request may be initiated by control processor 154 responsive to a lost connection signal from detector 152. The lost connection signal may indicate that the connection of wire telephone line 136 to wire telephone network 108 has been lost or that both the telephone connection and the power connection, based on the signal from power detection means 151 to control processor 154 have been lost, as described above. Thus, the detector 152, power detection means 151 and control processor 154 determine when a new frequency selection is required and initiate such a request.

Alternatively, the selected frequency information may be entered into base station 110 using keyboard 144 which would likewise pass the information to control processor 154. This allows the user of base station 110 to separately obtain the selected frequency information from the operator of wide area cellular network 100 and then manually input the data through keyboard 144.

The means for requesting and receiving the frequency indicating signal may also be contained in cellular terminal 120. If this is the case, cellular terminal 120 may contact the operator of wide area cellular network either through network cell station 102 or using telephone line connector 136 while cellular terminal 120 is parked in base station 110. Likewise, the input means for manually entering the request for a frequency indicating signal may be keypad 257 of cellular terminal 120.

If base station 110 is moved to a new location, any selected frequency previously used may be invalid and likely to cause interference with wide area cellular network 100 if transmissions from base station 110 are allowed to occur without obtaining a new selected frequency from the operator of wide area cellular network 100. It is desirable that base station 110 include means responsive a detected loss of telephone connection or telephone and power connection loss as described above for preventing transmission by transceiver 164 using the previously selected frequency. This may be readily accomplished by the circuitry illustrated in FIG. 3, as control processor 154 receives indicating signals from both detector circuit 152 and power detection means 151 which together act as a means for detecting loss of telephone and/or power connection. Control processor 154 may then control transceiver 164 to prevent further transmissions. Control processor 154 may further send an indication to display 142 indicating that a new frequency needs to be obtained. Control processor 154 may also send a message to the operator of the wide area cellular network via the PSTN network.

Initialization and channel acquisition operations according to U.S. Pat. No. 5,428,668 are illustrated in the flow chart of FIG. 6. Operations are initialized at block 300 when base station 110 is obtained by the user and plugged into a normal domestic telephone jack with telephone connector 136 and power outlet with power connector 134. On power up, detector 152 notifies control processor 154 that a telephone connection has been established to wire telephone line 108 and power sense signal from power detection means 151 notifies control processor 154 that line power has been connected. At block 302 base station 110 calls the wide area cellular network using a predetermined service number. The service number can be stored in base station 110, requiring only one or two keypad depressions on keyboard 144 to effect dialling or may be initiated automatically as described above. Alternatively, as described above, the user may contact the wide area cellular provider using a different phone and PSTN line and verbally request set-up information which may then be manually keyed into base station 110. The service number can appropriately be an "800" type number that is valid from all locations.

After the call is initiated at block 302, base station 110 notifies the wide area cellular network operator of the location of base station 110 at block 304. Using signalling facilities available in modern digital telephone networks, this may be accomplished by having the wide area cellular network operator request from the PSTN the number of the phone line originating the call. At block 306 base station 110 requests a control message including a frequency, from the wide area cellular network operator. The request may also include power level and channel information as well as frequency. At block 308 base station 110 receives a control message including an indication of the requested frequency from the wide area cellular network operator. This is then stored as an indication of the received frequency in base station 110 at block 310.

Base station 110 then transmits an indication of the received frequency to cellular terminal 120 at block 312. This transmission may be accomplished when cellular terminal 120 is parked in base station 110 using system connector 132. Alternatively, a frequency indicating signal may be transmitted by radio communications using transceiver 164 if cellular terminal 120 is not parked in base station 110. Such a transmission may be made using the last frequency assigned to base station 110 by the cellular network operator. Optionally, when it is necessary to reallocate the base frequency when cellular phone 120 is not parked in base station 110, the wide area network operator may place a call to cellular phone 120 over the cellular network and send a data message informing cellular terminal 120 of the change to the base frequency. However, if the base frequency will not be frequently reallocated, base station 110 may notify the user of the need to park cellular terminal 120 to obtain the new frequency information by displaying a warning message on display 142. At block 314 cellular terminal 120 stores an indication of the received frequency in cellular terminal 120.

Once the operating frequency for communications between base station 110 and cellular terminal 120 has initially been established, the assigned frequency will continue to be valid so long as base station 110 remains in the same location. However, should base station 110 be moved to a new location, interference with the wide area cellular network could result as the previously assigned frequency for base station 110 may be used in the local cell of the wide area cellular network where base station 110 is reinstalled. Consequently, at block 316 base station 110 determines if the telephone connection to the base station has been lost since the indication of the requested frequency was last received as described above. Base station 110 may further determine if the power connection to base station 110 has been lost since the indication of the requested frequency was last received. If the telephone connection or, alternatively, the telephone and power connections have been lost since the indication of the requested frequency was last received, base station 110 repeats steps 300 through 314 as described above. Alternatively, at step 316 when it has been determined that the connections have been lost base station 110 communications may be disabled until a new request for a selected frequency is initiated.

The above operations were described for an embodiment using the base station processor and keyboard to acquire the frequency information. In an alternative embodiment the keyboard and processor of cellular terminal 120 may be used to carry out the initialization operations. In this embodiment, all of the steps of FIG. 6 would be carried out while cellular terminal 120 was parked in base station 110. The communications with the wide area cellular network operator could then be handled by cellular terminal 120 with base station 110 serving to transmit signals between cellular terminal 120 and the network operator over PSTN 108.

It is preferred that base stations 110 not be allocated frequencies that are already in use in the cell of the wide area cellular network in which base station 110 is located, but to choose frequencies in use in the cell which is a maximum distance away. Allocation of frequency by the wide area cellular network provider in one embodiment is illustrated in FIG. 7. FIG. 7 illustrates a 21-cell frequency reuse pattern which is employed in some United States wide area cellular networks to avoid interference between neighboring cells. It is to be understood that a wide area cellular network 100 may include a plurality of such reuse patterns, and thus include greater than the 21 cells illustrated in FIG. 7. Each cell 104 in a cluster of 21 uses a different $\frac{1}{21}$ fraction of the total number of frequencies available to the wide area cellular provider. FIG. 7 shows the distribution of 21 groups of frequencies numbered 1 to 21 in a regularly spaced cell lattice. It may be seen that the cells using the same frequency groups are equispaced and root(21) cell diameters between centers where cell diameter is defined as the diameter of the inscribed circle of each hexagon.

It may be seen in FIG. 7 that cells numbered 15 or 8 are those most distant from the cells numbered 1. Therefore, the frequencies that should be used for base stations 110 located within cells numbered 1 should be drawn from frequency groups 8 and 15. Reciprocally, the frequencies used for base stations 110 located in cells numbered 15 should be drawn from frequency groups 1 and 8 and so on for cells numbered 8. By symmetry, base stations 110 in cells numbered 2 should use frequencies drawn from groups 9 and 16 and so forth. Thus, base stations 110 within each region may employ $\frac{2}{21}$ of the total number of frequencies available. If this contains at least 21 frequencies, then a 21-cell re-use plan can be employed to ensure that cells using the same frequency are at least root(21) cell diameters apart. This requires that the total number of frequencies employed in both the cell and cell systems is at least 21×21/2=220. This condition is normally satisfied in the U.S. AMPS system, where two competing operators share over 800 channels, having more than 400 each. Thus it is desirable that the cells should be capable of being programmed and reprogrammed to optimum frequencies from the mobile telephone network according to the cell in which they are located.

FIG. 8 illustrates how base frequency allocations may be made in the case of a cell re-use pattern such as the tighter, 7-cell pattern such as may be employed in the European GSM system. As shown in FIG. 8, within each cell, different areas are allocated different sets of frequencies for use by base stations 110 located within those subregions. In FIG. 8, the frequency allocation patterns for base stations 110 are illustrated for the cells numbered 1 and 5 respectively.

Figure 9:
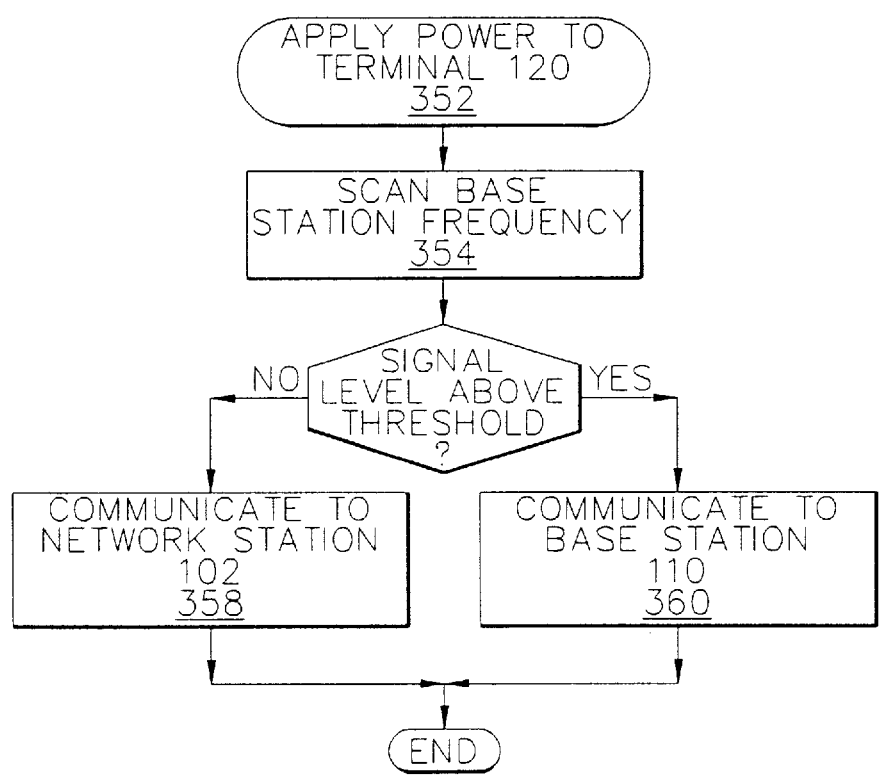
FIG. 9 is a flowchart illustrating operations of a radio personal communications system according to U.S. Pat. No. 5,428,668.

FIG. 9 illustrates a method for operation of the radio personal communications system once the frequency information has been acquired by base station 110 and its associated cellular terminal 120. Operations begin when power is applied to cellular terminal 120 at Block 352. Upon application of power, cellular terminal 120 scans the selected frequency allocated to its associated base station 110 at Block 354, and determines if a signal level above threshold has been detected, at Block 356. If a signal level above threshold has been detected, then terminal 120 is within the range 114 of its associated base station 110. Cellular terminal 120 then communicates at Block 360 over PSTN 108 by wireless communications to base station 110. If a signal level above threshold was not detected, then the terminal 120 is not within the range 114 of base station 110 and communications are initiated with network cell station 102 at Block 358, using conventional techniques.

It will be understood by those having skill in the art that a separate voice channel frequency and power level may be used for transmissions by base station 110 and terminal 120. The power levels may be different for the base station and the terminal if, for example, the base station has a larger antenna or a more sensitive receiver. It is also contemplated that the frequencies will be different since the terminal and base station would not typically transmit or receive on the same frequencies in a duplex transceiver. Alternatively, a single frequency and power level may be obtained from the wide area cellular provider and a second frequency and power level may be determined from the single frequency and power level.

Accordingly, the network provider/operator may allocate frequencies and power levels of base station-to-terminal communications. By allocating the frequency and power level of base station-to-terminal communications, same frequency interference within a network cell is reduced and the network provider obtains additional revenue from the licensed frequency spectrum for the base station.

Channel Allocation Using Received Signal Strength Measurements

Allocation of a cellular communications channel for communication between a cellular terminal and a telephone base station using received signal strength measurements according to the present invention will now be described. In general, during initialization of the telephone base station, the cellular terminal is controlled to obtain downlink measurements of received signal strength on all the control channels of the cellular system. The measurements are then relayed to the telephone base station which transmits the measurements over the wire telephone network line to a special service number connected to the wide area cellular network's central database. From these measurements, the wide area cellular network can derive the control channel with the lowest signal strength. This control channel is associated with a wide area cellular network cell which is a large distance from the telephone base station or a cell which is shadowed (blocked by obstructions). In either case, the wide area cellular network identifies the set of communications channels (also known as "voice channels" or "traffic channels") used by this cell and assigns this group of communications channels to the telephone base station. The set of control channels and communications channels used by a wide area cellular network are collectively referred to as a wide area cellular network's "radio channels".

The cellular terminal is then caused to perform a second frequency scan, to measure the received signal strengths on the frequencies in the set of communications channels which were just assigned. This scan will reveal the presence of other telephone base stations which use one of the frequencies in the set. The frequency with the lowest signal strength is selected for use in communications between the cellular terminal and the telephone base station. This frequency is preferably used by the telephone base station since it is far away or shadowed from a cell using this frequency and is far away or shadowed from another telephone base station using this frequency. Accordingly, the present invention creates an effective reuse pattern between telephone base stations within a given cell which is equal to the number of frequencies in the set of communications channels.

If the signal level on the selected frequency is too high to be acceptable, then apparently all channels are used by nearby telephone base stations and the reuse pattern may be unacceptable. The telephone base station can then request from the wide area cellular network a second group of channels, now corresponding to the measured cellular control channel with the next lowest signal strength. This will increase the effective reuse among the telephone base stations by a factor of two, thereby further reducing co-channel interference. By ordering the cellular terminal to obtain the downlink measurements and report them to the telephone base station and the wide area cellular network, there is no need for a downlink receiver in the telephone base station itself.

Figure 10A:
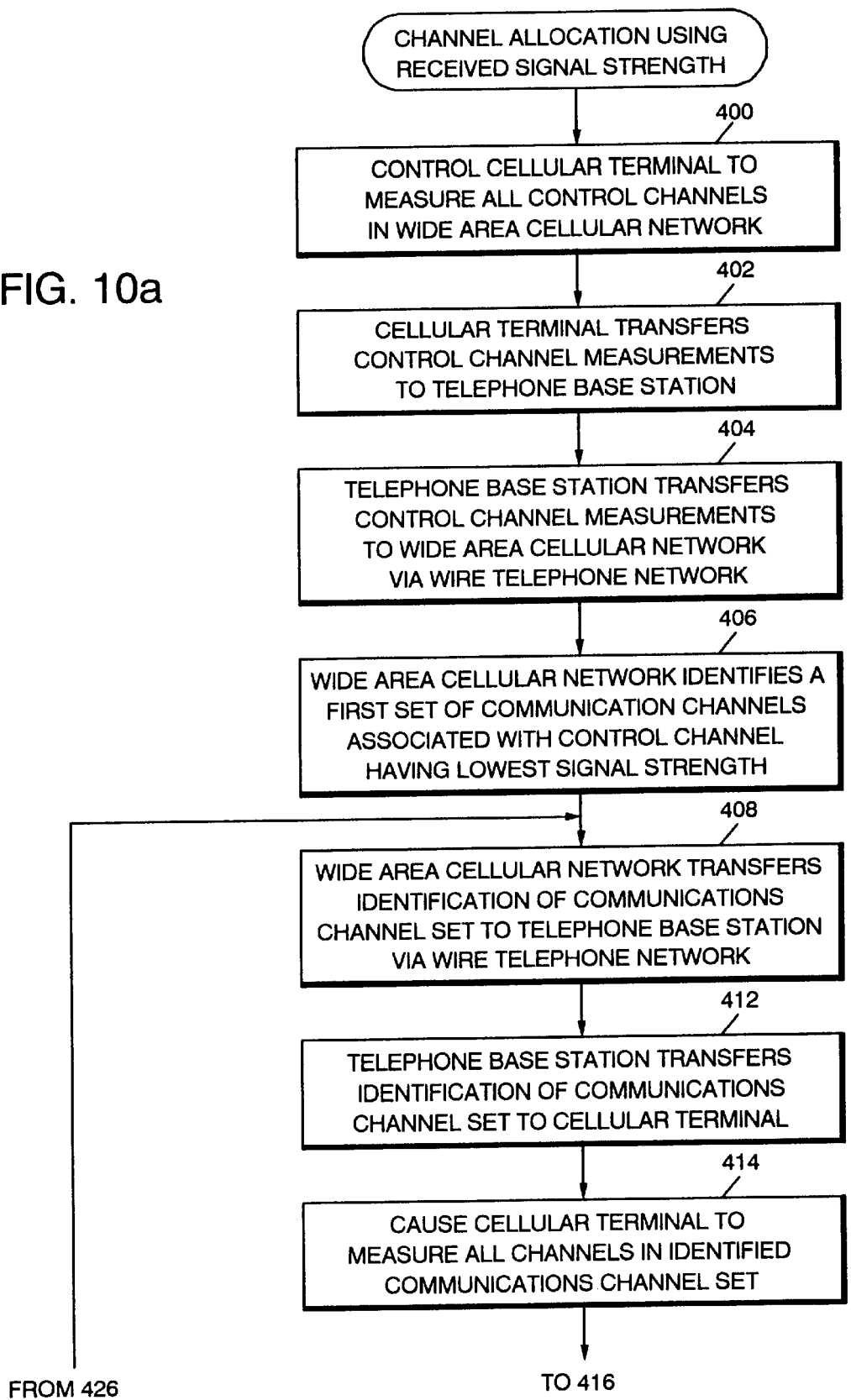

Referring now to FIGS. 10A–10B, operations for channel allocation using received signal strength according to the present invention will now be described in detail. It will be understood that these operations are preferably implemented by the control processor 154 of telephone base station 110, the control processor 254 of cellular terminal 120 and the control processor(s) of the wide area cellular network, operating under stored program control. However, it will also be understood that special purpose hardware and/or combinations of special purpose hardware and general purpose hardware operating under stored program control may be used.

As shown at Block 400, the cellular terminal is controlled to measure all of the control channels in the wide area cellular network. The operation of Block 400 may be initiated by telephone base station 110 upon application of power thereto and/or upon connection to the wire telephone network 108 as already described. The operation of Block 400 may also be initiated by the wide area cellular network via the wire telephone network connection to base station 110. In yet another alternative, this operation may be initiated by the cellular telephone, for example by user activation.

Preferably, after purchasing a telephone base station 110 and plugging the base station into a power source and a telephone jack, an initialization procedure is started by the user, for example, by dialing a service number on the wire telephone network which links the telephone base station to a central computer (control processor) including a database in the wide area cellular network. The wide area cellular network checks the validity of the telephone base station using an authentication procedure. The user may then be instructed to park the cellular telephone in the telephone base station so that a physical connection (electrical, electromagnetic such as optic, or acoustic) between the cellular telephone and the telephone base station is made. Alternatively, the wide area network operator can use the cellular telephone interface between the cellular network and the cellular terminal to transmit the instructions.

The wide area cellular network operator instructs the cellular telephone to scan all of the control channels of the wide area cellular network. In this scan, the cellular telephone identifies only the control channels in the wide area cellular network. As is known to those having skill in the art, each cell includes one or more control channels which generally use a constant, fixed transmit power and which carries a continuous data stream of control information. These control channels have formats such as fixed frequency, fixed frequency/time slot or special identifiers in the data stream, so that the cellular telephone can recognize these channels as being control channels. From each of these control channels, the cellular telephone makes a signal strength measurement.

As shown in Block 402, the cellular terminal transfers the control channel measurements to the telephone base station via the physical connection shown at 132 in FIG. 2. As shown at Block 404, the telephone base station transfers the control channel measurements to the wide area cellular network via the wire telephone network (136 in FIG. 2). Alternatively, the cellular telephone can directly send the measurement information to the wide area cellular network through the nearest cell 102.

Referring to Block 406, the wide area cellular network identifies the channel with the lowest received signal strength. Because of the fixed frequency reuse plan at a wide area cellular network, the wide area cellular network can also identify a first set of communications channels which are associated with the control channel having lowest signal strength. Because of the fixed channel reuse pattern, all cells using this control channel will use the same group of communications channels so that no particular cell needs to be identified. All of the channels in this group are potential candidates for the telephone base station to use, since they are transmitted by a cell which is weakly received in the telephone base station location due a large separation or shadowing.

It will also be understood by those having skill in the art that the cellular terminal itself may identify the control channel having the lowest received signal strength and transmit this control channel to the wide area cellular network. In yet another alternative, the telephone base station may identify the control channel with the lowest received signal strength and transfer this control channel to the wide area cellular network. However, in order to reduce the complexity of the cellular telephone and base station, the identification of the lowest received signal strength is preferably performed by the wide area cellular network, upon receipt of the relayed signal strength measurements from the base station.

Still referring to FIGS. 10A–10B, the wide area cellular network transfers identification of the communication channel set associated with the control channel having lowest signal strength to the telephone base station via the wire telephone network. At Block 412, the telephone base station transfers identification of the communication channel set to the cellular terminal. It will also be understood that the operations of Blocks 408 and 412 may be accomplished via wireless communication between the wide area cellular network and the cellular terminal.

At Block 414, the cellular terminal is caused to measure all the channels in the identified communication channel set. At Block 416, the cellular terminal transfers the communication channel measurements to the telephone base station. At Block 418, the telephone base station transfers communication channel measurements to the wide area cellular network via the wire telephone network. It will also be understood that the operations of Blocks 416 and 418 may be accomplished by directly transmitting the communication channel measurements to the wide area cellular network from the cellular terminal. At Block 422, the wide area cellular network selects the communications channel having the lowest signal strength. As described above in connection with Block 406, this selection may also take place in the cellular terminal or in the telephone base station.

It will be understood that the received signal strength of the lowest communications channel may be too high so that freedom from co-channel interference cannot be assured with acceptable certainty. See Block 424. If this is the case, then at Block 426, the wide area cellular network identifies a next set of communications channels associated with the control channel having the next lowest signal strength. Operations of Blocks 408–422 are then performed on the next set of communications channels. These operations may be performed repeatedly until at Block 424 an acceptable communications channel having acceptably low signal strength is identified. Then, at Block 428, the wide area cellular network transfers identification of the selected communications channel to the telephone base station via the wire telephone network. At Block 432, the telephone base station transfers the identification of the selected communications channel to the cellular terminal. Finally, at Block 434, the cellular terminal and telephone base station communicate in the local area using the selected communications channel.

A numerical example of the operations of FIGS. 10A–10B in a wide area cellular network 100 of FIG. 7 having a 21-cell channel reuse pattern will now be described. A 21-cell frequency re-use pattern is employed in some United States wide area cellular networks to avoid interference between neighboring cells. A 21-cell cluster uses control channels $F\_1a, F\_2a, \ldots F\_21a$ which are all unique in the cluster. Each cell is assigned one control channel. Associated with each control channel $F\_ia$ where $i=1, \ldots 21$, is a group of communications channels. The number of communications channels depends on the total number of frequencies licensed by the wide area network operator. The communications channels may be designated $F\_ib, F\_ic, F\_id, \ldots$ where $i=1, \ldots 21$. At Block 400 of FIG. 10, the telephone base station in cell 1 measures the signal strengths of control channels $F\_1a, F\_2a, \ldots F\_21a$. See FIG. 7. Since control channels $F\_15a$ and $F\_8a$ are transmitted by the most distant cells, their received signal strengths will most likely be the weakest. However, if a building is located between the telephone base station location and cell 4, $F\_4a$ might be very weak and a candidate for use.

The signal strength measurement reports of control channels $F\_1a \ldots F\_21$ are reported to the wide area cellular network (Blocks 402 and 404) which identifies the weakest control channel, say $F\_15a$. At Block 406, the wide area cellular network identifies the set of communications channels used in cell 15 and associated with control channel $F\_15a$; i.e. the set of $F\_15b, F\_15c, F\_15d, \ldots$. This identification is transferred to the telephone base station (Block 408) and to the cellular terminal (Block 412). The control channel $F\_15a$ itself is not included, as explained below.

The cellular terminal is then caused to make signal strength measurements on the channel group just assigned: $F\_15b, F\_15c, F\_15d, \ldots$. See Block 414. This measurement is not performed to measure the traffic activity in cell 15, but rather to sense the presence of nearby telephone base stations that already have been allocated one of the channels in the group. Again the reports are transferred to the telephone base station (Block 416), which now can either select the channel with the weakest signal strength itself, or retransmit the reports to the wide area cellular network (Block 418). The cellular network selects the channel in the group $F\_15b, F\_15c, F\_15d \ldots$ with the lowest signal strength, at Block 422.

The channel selected from the group is used as the telephone base station channel. This channel minimizes both the mutual interference between the telephone base station and the cellular environment because it is selected from the best cellular reuse group, and the mutual interference among the telephone base stations themselves because the weakest channel in the group was selected.

By selecting the best channel from the group, the telephone base station environment provides an automatic channel allocation with an effective reuse which equals the number of channels in the set. If there are not enough channels in the set to provide sufficient co-channel interference suppression, the telephone base station will recognize this in the second frequency scan, since the weakest channel in the group will still have a signal strength above that required. See Block 424. Then the telephone base station can request the wide area cellular network to assign a second group of channels (Block 426), which corresponds to the next weakest control channel.

In the above example, if $F\_15a$ was the weakest channel, but $F\_8a$ was the next weakest, then the wide area cellular network operator will assign a second group $F\_8b, F\_8c, F\_8d \ldots$ to the telephone base station at Block 426. Again the cellular terminal will scan the signal strengths on all the channels of this second group (Block 414) and the weakest is selected (Block 422). By having two groups available, the effective reuse between the telephone base stations is doubled. These operations can be repeated if required in order to solve co-channel interference problems in hot spots where many closely-spaced telephone base stations are located.

The cellular control channel itself is not included in the group assignment for many reasons. First, if a telephone base station selects a cellular control channel as the telephone base station channel, then another telephone base station may mistakenly identify the signals from that nearby telephone base station as being a nearby cellular base during initialization. As a result, the initializing telephone base station will not consider the associated communications channel group, although it is likely that there are attractive channels in this group since it was selected by a nearby telephone base station. Another reason not to include the control channel is to avoid interference between the controls of the telephone base station and cellular systems. Finally, cellular communications channels are more likely to give low interference than cellular control channels. Control channels have to transmit continuously at a constant, high power level. Communications channels are used intermittently (only when they are used for a voice or data communication), have DTX, and can apply automatic power control to reduce interference.

While the invention has been described primarily in terms of allocated frequencies, it is to be understood that the present invention is likewise directed to systems utilizing any form of multiplexing wherein a single frequency carries a plurality of channels. In such a system, the present invention obtains from the external source such as the wide area cellular network operator both assigned frequency information and the specific channel slot within the assigned frequency. Accordingly, the term "channel" as used herein includes frequency plus channel or frequency alone. It is also to be understood that the present invention may be used within any cellular type wireless communications system which incorporates any type of channel reuse pattern over a wide area communications network.

It will also be understood that the telephone base station need not use one particular communications channel from the set of assigned communications channels. Rather, all the communications channels from the assigned set may be used by employing sequential hopping. The hopping set is the set of communications channels used by a cell which is far away from the telephone base station. In this embodiment, signal strength measurements on the allocated communications channels need not be performed in order to minimize co-channel interference from nearby telephone base stations. Rather, this interference is minimized due to the nature of the sequential hopping, since each base station uses non-synchronized hopping with different hopping sequences. The cellular terminal can be readily adapted to use sequential hopping when communicating with the telephone base station since sequential hopping can be applied in the wide area cellular network as well, for example in the GSM system.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method for allocating a cellular communications channel for communication between a cellular terminal and a telephone base station, the telephone base station connecting a wire telephone network to the cellular terminal within a local region in a cell of a wide area cellular network which uses a plurality of control channels and communications channels within a cellular network spectrum, said allocating method comprising the steps of:

controlling said cellular terminal to measure received signal strengths of the control channels;

identifying a set of communications channels associated with a measured control channel having lowest received signal strength;

causing said cellular terminal to measure received signal strengths of the set of communications channels;

selecting from said set of communications channels, a communications channel having lowest received signal strength; and using the selected communications channel having lowest received signal strength for communication between said cellular terminal and said telephone base station within the local region.

2. A method according to claim 1 wherein said selecting step is preceded by the steps of:

determining whether the received signal strength of the communications channel having lowest received signal strength is sufficiently low; and repeating said identifying step and said causing step on a next set of communications channels associated with a measured control channel having next lowest received signal strength, if the received signal strength of the channel having lowest received signal strength is not sufficiently low.

3. A method according to claim 1 wherein said identifying step comprises the steps of:

transferring the control channel received signal strength measurements from said cellular terminal to said telephone base station;

transferring the control channel received signal strength measurements from the telephone base station to the wide area cellular network via said wire telephone network;

causing said wide area cellular network to identify a measured control channel having lowest received signal strength; and causing the wide area cellular network to identify the set of communications channels associated with the measured control channel having lowest received signal strength.

4. A method according to claim 3 wherein said step of causing said cellular terminal to measure received signal strengths of the set of communications channels is preceded by the steps of:

transferring the identified set of communications channels to said base station from said wide area cellular network via said wire telephone network; and transferring the identified set of communications channels from said base station to said cellular terminal.

5. A method according to claim 4 wherein said selecting step comprises the steps of:

transferring the communication channel received signal strength measurements from said cellular terminal to said telephone base station;

transferring the communication channel received signal strength measurements from the telephone base station to the wide area cellular network via said wire telephone network;

causing said wide area cellular network to identify a measured communications channel having lowest received signal strength; and causing the wide area cellular network to select from the set of communications channels, a communications channel having lowest received signal strength.

6. A method according to claim 5 wherein said using step is preceded by the steps of:

transferring identification of the selected communications channel to said base station from said wide area cellular network via said wire telephone network; and transferring the identification of the selected communications channel from said base station to said cellular terminal.

7. A method according to claim 1 wherein said controlling step, said identifying step, said causing step and said selecting step are all practiced while said cellular terminal is parked in said telephone base station.

8. A method according to claim 1 wherein said controlling step, said identifying step, said causing step and said selecting step are all practiced while said cellular terminal is parked in said telephone base station, via transfer of electrical signals, electromagnetic signals or acoustic signals between the telephone base station and the cellular terminal which is parked therein.

9. A measuring method for a cellular terminal and a telephone base station, the telephone base station connecting a wire telephone network to the cellular terminal within a local region in a cell of a wide area cellular network which uses a plurality of radio channels within a cellular network spectrum wherein said cellular terminal communicates with said telephone base station using one of said radio channels within said cellular network spectrum, said measuring method comprising the steps of:

controlling said cellular terminal to measure received signal strengths of selected radio channels;

transferring the received signal strength measurements from said cellular terminal to said telephone base station; and transferring the received signal strength measurements from the telephone base station to the wide area cellular network via said wire telephone network.

10. A method according to claim 9 further comprising the step of:

comparing the received signal strength measurements in the wide area cellular network to thereby identify a radio channel having low received signal strength.

11. A method according to claim 9 wherein said controlling step is preceded by the steps of:

transferring identification of the selected radio channels to said base station from said wide area cellular network via said wire telephone network; and transferring the identification of the selected radio channels from said base station to said cellular terminal.

12. A system for allocating a cellular communications channel for communication between a cellular terminal and a telephone base station, the telephone base station connecting a wire telephone network to the cellular terminal within a local region in a cell of a wide area cellular network which uses a plurality of control channels and communications channels within a cellular network spectrum, said allocating system comprising:

means for controlling said cellular terminal to measure received signal strengths of the control channels;

means, responsive to said controlling means, for identifying a set of communications channels associated with a measured control channel having lowest received signal strength;

means, responsive to said identifying means, for causing said cellular terminal to measure received signal strengths of the set of communications channels; and means, responsive to said causing means, for selecting from said set of communications channels, a communications channel having lowest received signal strength, such that the selected communications channel having lowest received signal strength is used for communication between said cellular terminal and said telephone base station within the local region.

13. A system according to claim 12 wherein said selecting means comprises:

means for determining whether the received signal strength of the communications channel having lowest received signal strength is sufficiently low; and means, responsive to said determining means, for using the selected communications channel having lowest received signal strength for communication between said cellular terminal and said telephone base station within the local region, if the received signal strength of the channel having lowest received signal strength is sufficiently low.

14. A system according to claim 12 wherein said identifying means comprises:

means for transferring the control channel received signal strength measurements from said cellular terminal to said telephone base station;

means for transferring the control channel received signal strength measurements from the telephone base station to the wide area cellular network via said wire telephone network;

means for causing said wide area cellular network to identify a measured control channel having lowest received signal strength; and means for causing the wide area cellular network to identify the set of communications channels associated with the measured control channel having lowest received signal strength.

15. A system according to claim 14 wherein said means for causing said cellular terminal to measure received signal strengths of the set of communications channels further comprises:

means for transferring the identified set of communications channels to said base station from said wide area cellular network via said wire telephone network; and means for transferring the identified set of communications channels from said base station to said cellular terminal.

16. A system according to claim 15 wherein said selecting means comprises:

means for transferring the communication channel received signal strength measurements from said cellular terminal to said telephone base station;

means for transferring the communication channel received signal strength measurements from the telephone base station to the wide area cellular network via said wire telephone network;

means for causing said wide area cellular network to identify a measured communication channel having lowest received signal strength; and means for causing the wide area cellular network to select from the set of communications channels, a communications channel having lowest received signal strength.

17. A system according to claim 16 wherein said selecting means further comprises:

means for transferring identification of the selected communications channel to said base station from said wide area cellular network via said wire telephone network; and means for transferring the identification of the selected communications channel from said base station to said cellular terminal.

18. A measuring system for a cellular terminal and a telephone base station, the telephone base station connecting a wire telephone network to the cellular terminal within a local region in a cell of a wide area cellular network which uses a plurality of radio channels within a cellular network spectrum, said measuring system comprising:

means for controlling said cellular terminal to measure received signal strengths of selected radio channels;

first means, responsive to said controlling means, for transferring the received signal strength measurements from said cellular terminal to said telephone base station; and second means, responsive to said first means, for transferring the received signal strength measurements from the telephone base station to the wide area cellular network via said wire telephone network.

19. A system according to claim 18 wherein said wide area cellular network further comprises:

means for comparing the received signal strength measurements to thereby identify a communications channel having low received signal strength.

20. A system according to claim 18 wherein said controlling means further comprises:

means for transferring identification of the selected radio channels to said base station from said wide area cellular network via said wire telephone network; and means for transferring the identification of the selected radio channels from said base station to said cellular terminal.

21. A radio personal communications system comprising:
a wide area cellular network including a plurality of cells which use a plurality of control channels and communications channels within a cellular network spectrum;
a cellular terminal;
a telephone base station, the telephone base station connecting a wire telephone network to the cellular terminal within a local region of a cell;
said cellular terminal comprising means for measuring received signal strengths of the control channels;
said wide area cellular network including means for identifying a set of communications channels associated with a measured control channel having low received signal strength, for using at least one of the communications channels for communication between said cellular terminal and said telephone base station within the local region.

22. A system according to claim 21 wherein said wide area cellular network further comprises means for directing said cellular terminal to measure received signal strengths of the set of communications channels;
said cellular terminal further comprising means, responsive to said identifying means, for selecting from said set of communications channels, a communications channel having low received signal strength, and for using the selected communications channel having lowest received signal strength for communication between said cellular terminal and said telephone base station within the local region.

23. A system according to claim 22 wherein said wide area cellular network further comprises:
means for determining whether the received signal strength of the communications channel having lowest received signal strength is sufficiently low; and
means for directing said cellular terminal to measure received signal strengths of a next set of communications channels associated with a measured control channel having next lowest received signal strength, if the received signal strength of the channel having lowest received signal strength is not sufficiently low.

24. A system according to claim 21 wherein said base station comprises:
means for receiving the control channels received signal strength measurements from said cellular terminal; and
means for transferring the control channel received signal strength measurements from the telephone base station to the wide area cellular network via said wire telephone network.

25. A system according to claim 24 wherein said base station further comprises:
means for receiving the identified set of communications channels from said wide area cellular network via said wire telephone network; and
means for transferring the identified set of communications channels from said base station to said cellular terminal.

26. A system according to claim 22 wherein said base station further comprises:
means for receiving the communication channel received signal strength measurements from said cellular terminal; and means for transferring the communication channel received signal strength measurements to the wide area cellular network via said wire telephone network.

27. A system according to claim 26 wherein said base station further comprises:
means for receiving identification of the selected communications channel from said wide area cellular network via said wire telephone network; and
means for transferring the identification of the selected communications channel to said cellular terminal.

28. A system according to claim 21 wherein said base station further comprises means for mechanically coupling said cellular terminal thereto; and
means for transferring electrical signals, electromagnetic signals or acoustic signals between the telephone base station and the cellular terminal which is mechanically coupled thereto.

29. A measuring method for a cellular terminal and a telephone base station, the telephone base station connecting a wire telephone network to the cellular terminal within a local region in a cell of a wide area cellular network which uses a plurality of radio channels within a cellular network spectrum, said measuring method comprising the steps of:
transferring signal strength measuring instructions from said wide area cellular network to said telephone base station via said wire telephone network;
transferring said signal strength measuring instructions from said telephone base station to said cellular terminal;
controlling said cellular terminal to measure received signal strengths of selected radio channels in said local region according to said signal strength measuring instructions; and
identifying at least one radio channel for communication between said telephone base station and said cellular terminal in said local region, based upon the measured received signal strengths of the selected radio channels in the local region.

30. A method according to claim 29 wherein the following step is performed after said controlling step:
transferring the measured received signal strengths from said cellular terminal to said telephone base station.

31. A method according to claim 30 wherein the following step is performed after said step of transferring the measured received signal strengths from said cellular terminal to said telephone base station:
transferring the measured received signal strengths from said telephone base station to said wide area cellular network via said wire telephone network.

32. A method according to claim 31 wherein said identifying step is performed by said wide area cellular network.

33. A method according to claim 32 wherein said identifying step is followed by the step of:
transferring identification of the at least one radio channel from said wide area cellular network to said telephone base station via said wire telephone network.

34. A method according to claim 33 wherein said step of transferring identification of the at least one radio channel from said wide area cellular network to said telephone base station via said wire telephone network is followed by the step of transferring said identification of the at least one radio channel from said telephone base station to said cellular terminal.

* * * * *

UNITED STATES PATENT AND TRADEMARK OFFICE
CERTIFICATE OF CORRECTION

PATENT NO. : 5,839,075
DATED : November 17, 1998
INVENTOR(S) : Jacobus Cornelius Haartsen and Paul W. Dent It is certified that error appears in the above-identified patent and that said Letters Patent is hereby corrected as shown below:

Title page,
Item [73], delete "Triangle Park" and substitute -- Research Triangle Park -- therefor.
Item [56], U.S. Patent 5,659,598, delete "8/1997" and substitute -- 3/1998 -- therefor.
Add the following Foreign Patent Documents:

| | | |
|---|---|---|
| 0637181A1 | 2/1995 | European Patent Office |
| 2282730A | 4/1995 | United Kingdom |
| 0660626A2 | 6/1995 | European Patent Office |
| 4344702A1 | 7/1995 | Germany |

Add the following Other Document:

PCT/US96/13328    1/1997    International Search Report

Signed and Sealed this

Ninth Day of October, 2001

*Attest:*

NICHOLAS P. GODICI
*Attesting Officer*    *Acting Director of the United States Patent and Trademark Office*